United States Patent Office 3,641,116
Patented Feb. 8, 1972

3,641,116
HARDENERS FOR WATER-SOLUBLE POLYMERS
Alfred Froehlich, Marly-le-Grand, Switzerland, assignor to Ciba Limited, Basel, Switzerland
No Drawing. Filed Sept. 6, 1968, Ser. No. 758,135
Claims priority, application Switzerland, Sept. 27, 1967, 13,484/67
Int. Cl. C07c *125/06*
U.S. Cl. 260—482 B                6 Claims

ABSTRACT OF THE DISCLOSURE

Compounds containing at least three carboxylic acid amide groups that may be used as hardening agents for water-soluble polymers, especially gelatine.

---

The present invention provides new compounds containing at least three carboxylic acid amide groups that may be used as hardening agents for water-soluble polymers, especially gelatin. They correspond to the formula (1)     $X[-Y-CO-NH-OC-R]_n$ in which R represents a residue which contains, in addition to two carbon atoms, 2 to 4 hydrogen atoms and also halogen atoms, the number of halogen atoms being such that the sum of the hydrogen atoms and any halogen atoms that may be present is 3 or 5, Y represents a hetero atom or a residue bound to X and CO by the same hetero atom, X represents an aliphatic, cycloaliphatic, aromatic or heterocyclic residue having the valency $n$, and $n$ stands for an integer not lower than 3.

The residue R thus consists solely of carbon and hydrogen atoms and, if desired, halogen atoms, the halogen atoms being preferably bromine and/or chlorine atoms. The residue R is either saturated or ethylenically unsaturated, and in both cases, those residues are preferred which contain two hydrogen atoms bound to the β-carbon atom. The two residues of the formulae (2)     $-CH_2-CH_2-Z$  and  (3)  $-CH=CH_2$ in which Z represents a chlorine or a bromine atom have been found to be specially advantageous.

The residue X which has the valency $n$ and which is thus at least trivalent, for example, trivalent to hexavalent, is bound $n$ times to the CO groups through —Y—, namely by a hetero atom, that is to say, an atom other than a carbon atom and which is at least divalent, and Y is itself either a (divalent) hetero atom, for example, a sulphur atom, but preferable an oxygen atom or a residue bound to X and CO by the same (more than divalent) hetero atom, it being essential that the remaining valencies of the hetero atom be saturated. When a nitrogen atom forms the bridge, Y may be, for example, an alkyl-N< group or preferably an —HN— group. In the case when the residues X are heterocyclic, the preferred residues are those containing an oxygen atom as a ring member. When Y is an oxygen atom, compounds of the Formula 1 in which the residues X are bound to Y through —CH$_2$— groups may be designated ester-like, and those in which the residues X are bound to Y through Y through —CO— groups may be designated anhydride-like. When Y is a bridging component containing nitrogen to which the residues X are bound through —CH$_2$— groups, the compounds may be designated amide-like:

(4)     <u>—CH$_2$—O</u>—CO—NH—OC—R—ester (5)     <u>—OC—O</u>—CO—NH—OC—R—anhydride (6)     <u>—CH$_2$—NH</u>—CO—NH—OC—R—amide As can already be seen from the foregoing, compounds of the invention which are particularly valuable are those corresponding to the formula (7)     $X_1[-Y_1-CO-NH-OC-R_1]_n$ in which $R_1$ represents one of the following residues:

(7.1)     $-CH=CH_2$ (7.2)     $-CH_2-CH_2-Z$ (7.3)     $-\underset{Z}{\underset{|}{CH}}-CH_2$ and (7.4)     $-\underset{Z}{\underset{|}{CH}}-\underset{Z}{\underset{|}{CH_2}}$ in which Z represents a halogen atom, $Y_1$ represents an oxygen or a sulphur atom or an —NH— group, $X_1$ represents an aliphatic or heterocyclic residue having the valency $n$, and $n$ stands for an integer not lower than 3.

In this connection compounds of the formula (8)     $X_2[-O-CO-NH-OC-R_2]_n$ are preferred in which $R_2$ represents a residue of the formula $-CH_2-CH_2-Z$ or $-CH=CH_2$ wherein Z represents a chlorine or bromine atom, $X_2$ represents an aliphatic or heterocyclic residue having the valency $n$, the heterocyclic ring containing only carbon atoms and one oxygen atom as ring members, and $n$ stands for an integer not lower than 3.

Finally, special mention must be made of the compounds of the formula (9)     $X_3\left[-O-CO-NH-OC-\underset{[H_{(m-1)}][Cl_{(m-1)}]}{\underset{|\quad\quad|}{CH-CH_2}}\right]_n$ in which $X_3$ represents an aliphatic hydrocarbon residue having the valency $n$ and which is further substituted at most by hydroxyl groups or a corresponding heterocyclic residue in which the heterocycle is composed of 4 to 5 carbon atoms and an oxygen atom, and $m$ and $n$ each represents an integer, $m$ being not greater than 2. The compounds of the Formula 9 thus contain residues of the Formula 7.1 when $m=1$, or chlorine-containing residues of the Formula 7.2 when $m=2$.

The compounds of the Formula 1 may be prepared by methods known per se, preferably by additively combining halogenoalkylisocyanates of the formula

(10)     $O=C=N-OC-R'$ in which R' represents a saturated residue which, in addition to 2 carbon atoms, contains 2 to 4 hydrogen atoms and at least one halogen atom, the sum of the hydrogen atoms and the halogen atoms amounting to 5, in at least a molecular ratio of 3:1 with polyfunctional compounds of the formula

(11)     $X[-Y-H]_n$ in which Y represents a hetero atom or a residue bound to X and H by the same hetero atom, X represents an aliphatic, cycloaliphatic, aromatic or heterocyclic residue having the valency $n$, and $n$ represents an integer not lower than 3, and, if necessary, eliminating hydrogen halide from the residues R'.

The application of this manufacturing process in respect of the compounds of the Formulae 7, 8 and 9 is indicated by the formulae themselves. The preferred starting materials of the Formula 10 are those containing the halogen-oalkylene residues of the formulae —CHBr—CH$_2$Br and —CH$_2$—CH$_2$Cl. Hydrogen halide can be especially easily eliminated from these residues with formation of the group —CBr=CH₂ or —CH=CH₂.

Starting materials of the Formula 11 may be, for example, aromatic, but especialy aliphatic and heterocyclic compounds containing at least three mercapto, hydroxyl or primary or secondary amino groups. It is also possible for different groups of this kind to be bound to the same residue X, for example, mercapto and hydroxyl groups or amino and hydroxyl groups. Substances that are specially suitable and also readily available are aliphatic polyhydric alcohols having at least three hydroxyl groups, for example, glycerol, erythritol, xylitol, mannitol and pentaerythritol and also polyvinyl alcohol. Also suitable are heterocyclic polyhydric alcohols which contain only carbon atoms and a single oxygen atom as ring members, the preferred compounds being those having five-membered to six-membered rings possessing only single bonds between the ring members. Examples are laevulose, xylose, glucose and mannose.

Suitable alicyclic polyhydroxyl compounds are, for example, cyclohexane-1,2,3- or -1,3,5-triol or inositol. A suitable aromatic polyhydroxyl compound that may be mentioned is 1,3,5-tri-(hydroxymethyl)-benzene (Compte Rendu 97, 177). The following are given as examples of polyamines, polymercapto compounds and compounds containing different groups of the formula —YH: triaminopropane (B. 6, 1290), N - (3 - aminopropyl)-1,4-butanediamine, N,N' - bis-(3-aminopropyl)-1,4-butanediamine, 3 - aminopentanediol - (2,4) (B. 55, 321), 3-amino - 2,5 -dimethylhexanediol - (2,5) (J. Pharm. Soc. Jap. 48, 42), 3 - aminopropanediol - (1,2) (German patent specification No. 330,801), thioglycerol, dithioglycerol and trithioglycerol (A. [6], 7, 227).

The compounds of the Formula 1 may be used as cross-linking agents in the textile and leather industries, in paper manufacture, and in the plastics, glue and gelatine industries. They are intended primarily as hardening agents for water-soluble polymers, for example, polyvinyl alcohol or gelatine, especially in photographic gelatine layers. The residues R of the compounds of the Formula 1 react with the hydroxyl, sulphydryl, amino or —NH— groups of the gelatine with formation of homopolar bonds. The reaction between the gelatine and these compounds generally proceeds easily and in the usual manner. They are generally sufficiently soluble in water, but they are specially readily soluble in solvents for example methanol, ethanol and dimethylformamide.

Since the compounds contain at least three groupings of the formula —CO—NH—CO—Y— they are sufficiently hydrophilic not to precipitate or crystallize in the gelatine, even when used in fairly large amounts. For example, a solution of the hardening agent in water, ethanol or methanol may be combined with gelatine at room temperature or a slightly elevated temperature, and the gelatine, which may contain a silver halide and/or other materials used for the production of photographic images, may be cast on a support in the customary manner to form a layer and, if necessary, dried. The layer so obtained may then be subjected to an elevated temperature for a certain period, for example, 18 hours, or allowed to stand at room temperature. Hardening takes place quickly and at an increasing rate, and the melting point of the gelatine is raised considerably, for example, by 25° up to 60° C. This raising of the melting point is largely independent of temperature and time of reaction. The desired degree of hardness can advantageously be obtained by the amount of hardener used. The amount of hardener employed is advantageously within the range of from 0.25 to 5%, referred to the amount of dry gelatine. It is evident that hardening of the gelatine is brought about by cross-linkage. Hardening does not impair the photographic properties of the light-sensitive coatings or the reactivity of the colour-couplers or dyestuffs. Furthermore, the pH value and the viscosity of the gelatine remain virtually unchanged when the hardener is present.

The new hardeners have a special advantage: when applied in a low concentration, the gelatine coatings are sufficiently hard after 18 to 24 hours to permit testing immediately after manufacture, even at an elevated temperature or in processing baths having a powerful action.

The compounds of the Formula 1 are also suitable for hardening auxiliary coatings in multi-layer materials, for example, separating layers, filter layers or covering layers.

The compounds having a relatively low molecular weight, for example, compounds in which $n=3$ to 5, and adequate solubility in water diffuse well in multi-layer material. This means they need be added only to the auxiliary layers in order to bring about hardening of the neighbouring silver halide layers. However, when used in photographic layers the compounds become non-diffusing as the molecular weight increases, this applying in particular to polymeric products. This property has decided advantages in several respects in the manufacture of multi-layer materials. When casting multi-layer material it is known that the hardener always diffuses out of the upper layers into the lower layers, which means that the lower layers are hardened to a greater degree than the upper layers; this applies whether wet material is cast on solidified material or dry material. These differences in the degree of hardening cause separation of the layers or give rise to a distorted grain effect on development of the materials. This harmful migration of hardener in multi-layer material can be avoided by the use of hardeners in accordance with the invention that are virtually non-diffusing. Conversely, the compounds of the invention that are virtually non-dixusing also permit individual hardening of the separate layers by varying the amount of hardener used, this procedure being of importance in the manufacture of multi-layer materials in which the emulsion layers contain dyestuffs or dyestuff-formers, because it is known that additives of this kind depress the melting points of gelatine layers to varying degrees; correction can be effected by an appropriate increase in the amount of hardener added. The hardeners which are virtually non-diffusing also permit the protective covering layer to be hardened more than the emulsion layers beneath it without any effect on the hardening of the said emulsion layers. The compounds of the Formula 1 which are free from halogenoalkyl groups also have the advantage that they do not change the pH of the emulsions during the hardening process.

The following examples illustrate the invention.

EXAMPLE 1

1.85 grams of distilled glycerol are dissolved in
50 ml. of absolute ether, and then
8.5 grams of β-chloropropionylisocyanate are added dropwise at —10° C. while stirring. The batch is stirred for 12 hours at room temperature, suction-filtered and the residue is washed twice with ether. The residue is then recrystallized from methanol in the presence of
0.5 gram of active carbon, 5.4 grams of colourless crystals melting at 153° C. are obtained.
2.6 grams of this compound of the formula

(12)
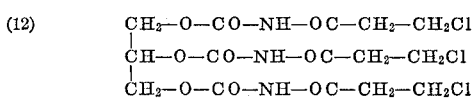

are dissolved in
150 ml. of acetone, and then
1.6 grams of triethylamine are added at 15° C. The batch is stirred for 12 hours at room temperature, the triethylamine hydrochloride which precipitates is removed by filtration,
10 mg. of hydroquinone are added to the filtrate and distillation is effected in vacuo at a bath temperature of 30° C. The residue of 2.1 grams is recrystallized from
20 ml. of water in the presence of
10 mg. of hydroquinone and
0.3 gram of carbon.
1.8 grams of the compound of the formula

(13) 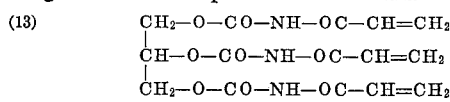

are obtained in the form of colourless crystals.

EXAMPLE 2

2.45 grams of meso-erythritol are suspended in
50 ml. of acetonitrile, and then
10.75 grams of β-chloropropionylisocyanate are added dropwise at −10° C. while stirring. The batch is stirred for 24 hours at room temperature, suction-filtered and the residue is washed three times with
10 ml. of ether each time. The residue is recrystallized from
250 ml. of methanol in the presence of
1 gram of carbon. 7 grams of the compound of the formula

(14) 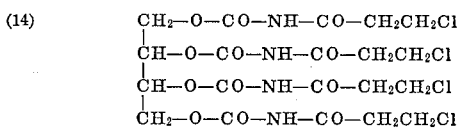

are obtained in the form of colourless crystals decomposing at 190° C. (not sharp).

EXAMPLE 3

3.3 grams of the compound of the Formula 14 are dissolved at 50° C. in
20 ml. of dimethylformamide, the solution is cooled to 15° C. and then
3 ml. of triethylamine are slowly added while stirring, the temperature being kept at between 10 and 15° C. by cooling. The batch is stirred for 24 hours at room temperature, the triethylamine hydrochloride that precipitates is removed by suction filtration,
100 ml. of absolute ether are added to the filtrate and the batch is allowed to stand for 24 hours at 0° C. The crystals that precipitate are isolated by suction filtration, washed with ether and dried in vacuo at 20° C.
2.6 grams of the compound of the formula

(15) 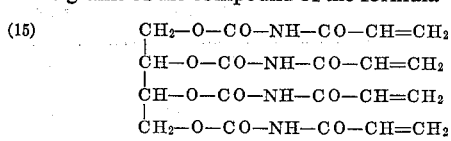

are obtained.

EXAMPLE 4

9 grams of laevulose are suspended in
100 ml. of acetonitrile, and then
28 grams of β-chloropropionylisocyanate are added at −10° C. Dissolution is complete after about 2 hours. The batch is stirred for a further 12 hours at room temperature, filtered, and the volatile components are distilled from the filtrate in vacuo at a bath temperature of 40° C. The residue is triturated with
100 ml. of ether, isolated by suction filtration and washed, with 20 ml. of ether.

24 grams of the compound of the formula

(16) 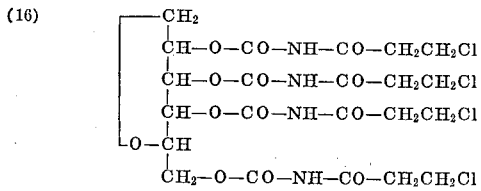

are obtained in the form of a white powder.

EXAMPLE 5

7 grams of the compound prepared in accordance with Example 4 which corresponds to the Formula 16 are mixed with
40 ml. of acetone, and then
5 ml. of triethylamine are slowly added at 15° C. The batch is stirred for 12 hours at room temperature and the triethylamine hydrochloride that precipitates is removed by filtration.
200 mg. of hydroquinone are added to the filtrate and the batch is evaporated to dryness in vacuo at a bath temperature of 20° C.

3 grams of the compound of the formula

(17) 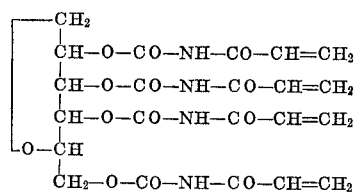

are obtained in the form of a colourless powder which is soluble in methanol and water.

EXAMPLE 6

4.57 grams of xylitol are suspended in
50 ml. of acetonitrile, and then
7 grams of β-chloropropionylisocyanate are added at −10° C. The batch is stirred for a further 24 hours at room temperature, filtered, and the filtrate is evaporated to dryness in vacuo at a bath temperature of 30° C. The residue is triturated with
100 ml. of ether, isolated by suction filtration and washed with
50 ml. of ether. After drying in vacuo at 20° C., 4.2 grams of the compound of the formula

(18) 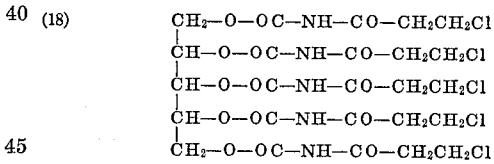

are obtained in the form of a colourless powder.

EXAMPLE 7

4.5 grams of xylose are suspended in
50 ml. of acetonitrile and then
5.5 grams of β-chloropropionylisocyanate are added at −10° C. The batch is stirred for a further 24 hours at room temperature, filtered, and the filtrate is evaporated to dryness in vacuo at a bath temperature of 30° C. The residue is triturated with
100 ml. of ether, isolated by suction filtration and washed with
50 ml. of ether. After drying in vacuo at 20° C., 5.6 grams of the compound of the formula

(19) 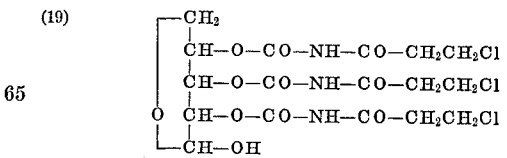

are obtained in the form of white powder.

EXAMPLE 8

7.29 grams of d-mannitol are suspended in
50 ml. of acetonitrile, and then
8.1 grams of β-chloropropionylisocyanate are added dropwise at −10° C. The batch is stirred for a further 24 hours at room temperature, suction-filtered; 5.5 grams of the compound of the formula

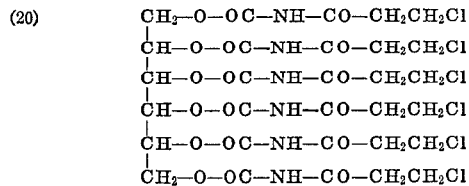

(20)

are obtained in the form of a white powder.

EXAMPLE 9

4.4 grams of a high-molecular-weight polyvinyl alcohol (more than 90% saponified), a 4% aqueous solution of which has a viscosity of 60 cp. are suspended in 50 ml. of acetonitrile and then
3.5 grams of β-chloropropionylisocyanate are added at —10° C. The batch is stirred for a further 72 hours at room temperature, suction-filtered and the filtrate is evaporated to dryness in vacuo at a bath temperature of 30° C. The residue is triturated with
100 ml. of ether, isolated by suction filtration and washed with
50 ml. of ether.
2.8 grams of a colourless, water-soluble powder are obtained.

EXAMPLE 10

6.8 grams of pentaerithrytol are suspended in
150 ml. of acetonitrile, and then
26.8 grams of β-chloropropionylisocyanate are added dropwise at —10° C. When all the β-chloropropionylisocyanate has been added, the cooling is removed and the temperature slowly rises to 35° C. The batch is then stirred for 3 hours at room temperature, diluted with
100 ml. of ether, suction filtered, the residue is washed with ether and dried in vacuo at 60° C. 31 grams of reaction product having a melting point of 175 to 185° C. are obtained.
13.4 grams of the product so obtained are dissolved in
30 ml. of dimethylformamide, and then
8.5 grams of triethylamine are added dropwise at —10° C. The cooling is removed and stirring is continued. The temperature rises to 22° C. The batch is stirred for 3 hours at room temperature, diluted with
50 ml. of water, suction filtered, the residue is washed with water until free from chlorine, washed with
100 ml. of methanol and then dried in vacuo at 60° C.

8 grams of the compound of the formula

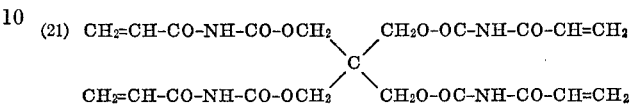

(21)

are obtained.

EXAMPLE 11

10 millilitres of water and 0.5 ml. of a 0.5% methyl alcohol solution of the compound of the Formula 13 (Example 1) are added to 20 ml. of 10% gelatine. The solution is cast on a film measuring 18 cm. x 24 cm. and the film is dried at a circulating-air temperature of 38° C. After storage for 24 hours, the melting point is above 95° C.

EXAMPLE 12

10 millilitres of water and 4 ml. of a 5% methyl alcohol solution of the compound of the Formula 19 (Example 7) are added to 20 ml. of a 10% gelatine. The solution is cast on a film measuring 18 cm. x 24 cm. and the film is dried at a circulating-air temperature of 38° C. After storage for three days the melting point is 82° C.

EXAMPLE 13

4 millilitres of a 20% solution of the compound of Example 3 in dimethylformamide are added to 1 kg. of silver bromide emulsion containing 8% of gelatine, and the solution is cast on a film and dried. After storage for 24 hours at room temperature the coating has a melting point above 95° C.

The following table gives further results obtained when hardening aqueous gelatine with the compounds described in Examples 1 to 10.

| Example | Formula | Percent based on gelatine | Dissolved in— | Melting point after 24 hours, °C. | 3 days, °C. | 4 days, °C. |
|---|---|---|---|---|---|---|
| 1 | (13) | 1 | 5% in methanol | >95 | | |
| | | 2 | | >95 | | |
| | | 4 | | >95 | | |
| | | 6 | | >95 | | |
| 2 | (14) | 1 | 10% in dimethylformamide | 38 | | 38 |
| | | 2 | | 40 | | 40 |
| | | 4 | | 41 | | 65 |
| | | 8 | | 46 | | >95 |
| 3 | (15) | 0.5 | 20% in dimethylformamide | >95 | | |
| | | 2 | | >95 | | |
| | | 4 | | >95 | | |
| 4 | (16) | 1 | 10% in methanol | 41 | | 65 |
| | | 2 | | 41 | | 86 |
| | | 4 | | 41 | | 86 |
| | | 8 | | 42 | | 91 |
| 5 | (17) | 0.5 | do | 44 | | 52 |
| | | 1 | | 65 | | 80 |
| | | 2 | | 80 | | 90 |
| | | 4 | | 95 | | >95 |
| 6 | (18) | 1 | 5% in methanol | 42 | | |
| | | 2 | | 42 | | |
| | | 4 | | 42 | | |
| | | 8 | | 43 | | |
| 7 | (19) | 1 | do | 42 | 50 | |
| | | 2 | | 45 | 82 | |
| | | 4 | | 48 | 94 | |
| | | 8 | | 58 | >95 | |
| 8 | (20) | 1 | do | 42 | 42 | |
| | | 2 | | 42 | 44 | |
| | | 4 | | 42 | 80 | |
| | | 8 | | 43 | 80 | |
| 9 | | 2 | 5% in water | 42 | 46 | |
| | | 8 | | 48 | 81 | |
| | | 8 | | 83 | 94 | |
| | | 10 | | 95 | >95 | |
| 10 | (21) | 0.25 | 10% in dimethylformamide | | 88 | |
| | | 0.5 | | | 47 | |
| | | 1.0 | | | >95 | |
| | | 2.0 | | | >95 | |

I claim:
1. A compound of the formula

$$X_1(-O-CO-NH-OC-R_1)_n$$

in which $R_1$ represents $CH_2=CH_2-$ or $Z-CH_2-CH_2-$, wherein Z is a halogen atom, $X_1$ represents an unsubstituted or substituted saturated aliphatic hydrocarbon radical having at least 3 carbon atoms, or an unsubstituted or substituted heterocyclic radical in which the hetero ring is composed of 4 to 5 carbon atoms, and one oxygen atom; and wherein the substituents are hydroxyl groups; each radical having the valency $n$, and $n$ stands for an integer of at least 3.

2. A compound as claimed in claim 1 wherein Z is chlorine or bromine.

3. A compound as claimed in claim 1 of the formula $$X_2[-O-CO-NH-OC-R_2]_n$$

in which $R_2$ represents a radical of the formula $$-CH_2CH_2-Z_1$$

or $-CH_2=CH_2$, $Z_1$ being a chlorine or a bromine atom, $Z_2$ represents an aliphatic hydrocarbon radical which has at least 3 carbon atoms and is substituted at most by hydroxyl groups or a heterocyclic radical in which the hetero ring is composed of 4 to 5 carbon atoms and one oxygen atom and which is substituted at most by hydroxyl groups, each radical having the valency $n$ and $n$ represents an integer of at least 3.

4. A compound as claimed in claim 1 of the formula

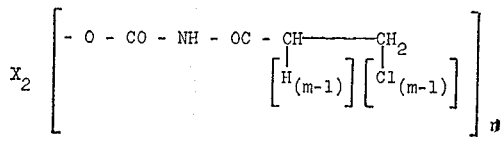

in which $X_2$ represents an aliphatic hydrocarbon radical which has at least 3 carbon atoms and is substituted at most by hydroxyl groups or a heterocyclic radical in which the hetero ring is composed of 4 to 5 carbon atoms and one oxygen atom and which is substituted at most by hydroxyl groups, each radical having the valency $n$, $n$ represents an integer of at least 3 and $m$ an integer of at most 2.

5. A compound as claimed in claim 1 of the formula

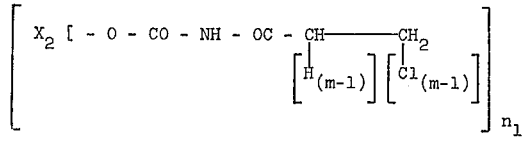

in which $X_2$ represents an aliphatic hydrocarbon radical which has at least 3 carbon atoms and is substituted at most by hydroxyl groups or a heterocyclic radical in which the hetero ring is composed of 4 to 5 carbon atoms and one oxygen atom and which is substituted at most by hydroxyl groups, each radical having the valency $n$, $n_1$ represents an integer of 3 to 6 and $m$ an integer of at most 2.

6. The compound as claimed in claim 1 of the formula

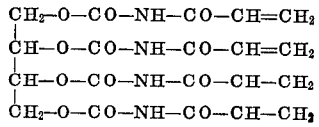

References Cited

UNITED STATES PATENTS 3,331,678  7/1967  Chappelow et al. __ 260—482 B

LORRAINE A. WEINBERGER, Primary Examiner

P. J. KILLOS, Assistant Examiner

U.S. Cl. X.R.

96—87 R; 106—126, 287 R; 260—234 R, 455 A, 546, 553 E

UNITED STATES PATENT OFFICE
CERTIFICATE OF CORRECTION

Patent No. 3,641,116          Dated February 8, 1972

Inventor(s) ALFRED FROEHLICH

It is certified that error appears in the above-identified patent and that said Letters Patent are hereby corrected as shown below:

Claim 3, column 9, line 22, delete "$Z_2$" and substitute --- $X_2$ ---.

Claim 6, column 10, the right-hand side of the structural formula should read:

$$-CO-CH=CH_2$$
$$-CO-CH=CH_2$$
$$-CO-CH=CH_2$$
$$-CO-CH=CH_2$$

Signed and sealed this 18th day of July 1972.

(SEAL)
Attest:

EDWARD M. FLETCHER, JR.
Attesting Officer

ROBERT GOTTSCHALK
Commissioner of Patents